United States Patent
Bartfai et al.

(10) Patent No.: US 7,093,154 B2
(45) Date of Patent: Aug. 15, 2006

(54) CRITICAL ADAPTER LOCAL ERROR HANDLING

(75) Inventors: Robert F. Bartfai, West Shokan, NY (US); John W. Doxtader, Hurley, NY (US); Leroy R. Lundin, West Hurley, NY (US); Dawn S. Moyer, Catskill, NY (US); Nicholas P. Rash, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 10/028,525

(22) Filed: Oct. 25, 2001

(65) Prior Publication Data

US 2003/0101367 A1    May 29, 2003

(51) Int. Cl.
*G06F 11/00* (2006.01)
(52) U.S. Cl. ........................ 714/4; 714/2; 714/9; 714/43
(58) Field of Classification Search .................... 714/2, 714/4, 9, 43
See application file for complete search history.

(56) References Cited

U.S. PATENT DOCUMENTS

| | | | |
|---|---|---|---|
| 3,533,065 A | 10/1970 | McGilvray et al. ...... 340/172.5 |
| 3,564,506 A | 2/1971 | Bee et al. ................. 340/172.5 |
| 4,059,748 A | 11/1977 | Violino ..................... 235/303.1 |
| 4,072,852 A | 2/1978 | Hogan et al. ............. 235/303.1 |
| 4,635,258 A | 1/1987 | Salowe ......................... 371/16 |
| 4,845,614 A | 7/1989 | Hanawa et al. ............. 364/200 |
| 5,014,190 A | 5/1991 | Johnson ...................... 364/200 |
| 5,388,254 A | 2/1995 | Betz et al. ................... 395/575 |
| 5,563,799 A | 10/1996 | Brehmer et al. ............ 364/481 |
| 5,664,219 A * | 9/1997 | Glassen et al. ................ 710/5 |
| 5,907,563 A | 5/1999 | Takeuchi et al. .............. 371/35 |
| 6,766,470 B1 * | 7/2004 | Shah .............................. 714/9 |
| 2003/0018926 A1 * | 1/2003 | Chen ............................. 714/4 |

* cited by examiner

*Primary Examiner*—Robert Beausoliel
*Assistant Examiner*—Joseph D Manoskey
(74) *Attorney, Agent, or Firm*—Lily Neff; Lawrence D. Cutter

(57) ABSTRACT

Adapters, which provide message communications capabilities in a multinode data processing network, are provided with a mechanism for indicating critical errors from which recovery may ultimately be possible. Error handling capabilities are incorporated which operate both globally and locally to insure, to the greatest extent possible, that applications running on the network are not prematurely terminated and that the node with the error affected adapter is not prematurely removed from its connectivity with the other nodes within it network group.

6 Claims, 3 Drawing Sheets

CRITICAL ADAPTER LOCAL ERROR HANDLING

BACKGROUND OF THE INVENTION

The present invention is generally directed to error handling in multinode data processing networks. More particularly the present invention is directed to a cooperative arrangement of nonlocal operations and local (that is, within node) error handling in which distributed and/or parallel structured applications are maintained in a running, albeit suspended, state to accommodate more finely grained local error handling. Even more particularly the present invention provides coordination of the improved local error handling capabilities with global operations to prevent the unnecessary termination of running application and/or other programs.

Multinode data processing systems are employed to run user programs (that is, applications) using both distributed and parallel processing modalities. Operating system level software running on the various nodes of such systems handles communications between the nodes. The user applications communicate from node to node via messages sent through a switch. In the pSeries of SP products marketed and sold by International Business Machines, Inc., the assignee of the present invention, these messages are transmitted using the publicly available Message Passing Interface (MPI) as well as Internet Protocols. The messages are sent from node to node via a switch.

Utility programs, such as the publicly available Group Services interface provided with such systems, permit users to form groups of nodes for the purposes of accomplishing specific user application tasks such as searching, sorting or numerical processing. The switch receives a message from a sending node and is capable of directing that message to one or more of the other nodes within the established node group (that is, to the receiving nodes). In these multinode systems, communication takes place through adapters which provide a communication channel to the switch from memory and data processing elements within each node. To the extent needed by various application programs, this communication is coordinated through a primary node in the group.

Accordingly, it is seen that the adapters provide a key link in the communication process that permits distributed and parallel operations to take place. These operations have both a local and a global aspect. Adapters perform their own data processing functions which include interrupt generation at the local node, typically in response to information packet message receipt so that incoming messages are directed to appropriate memory locations within the memory units of the various processor nodes. However, because of their location in the communication path, an error occurring in an adapter unit can exhibit both local and global effects. The present inventors have appreciated that there is an unappreciated spectrum of severity levels in adapter errors, that some errors are more predictable than others, that some errors have a greater likelihood of recoverability and that recovery times can become so large that global operations are adversely, albeit unnecessarily, affected. However, in the past serious adapter errors have caused entire nodes to become nonfunctional solely because of adapter problems. As a result the node was then fenced off and intervention by a human systems administrator was required to remedy the problem. Such errors can result in the termination of applications and jobs that are in running states. However, some errors even though characterizable as "serious," produce adapter states from which recovery is possible. Nonetheless, these recovery operations typically involve adapter reset operations and the early capture of fault data for hardware debugging purposes. Together, or individually, these operations can consume more than a desirable or tolerable amount of time to complete. In this regard, it is noted that recovery operations, by their very nature, are unpredictable in their outcomes and in their duration.

Adapter errors are addressed in several ways. The simplest approach is to simply count the number of "retry" events and if the number exceeds a predetermined threshold, the node is fenced off from communication with the rest of the system which often means that running jobs are terminated and eventually have to be restarted from a much earlier stage in their progress. In adapter error recovery systems that are solely based on a time-out approach after pending error recovery operations have been initiated, there has been a failure to mesh conditions present within a local node with more global considerations. Most recovery algorithms involve retry operations at the problem node, that is, at the node with the problem adapter. Some approaches involve retry operations carried out from the global node group perspective. But these methods often result in an unnecessary disconnection of the affected node from the rest of the system. While many of these error recovery schemes are capable of handling relatively transient errors, they fail when the errors become more serious and/or are of longer duration.

SUMMARY OF THE INVENTION

In accordance with a first preferred embodiment of the present invention, a method is provided for handling errors in adapters used for communication in multinode data processing networks. As a first step in the method, a specifically identifiable error condition within an affected adapter is detected. This error is detected via an adapter interrupt in which specific bits in the adapter interrupt registers are set by the adapter. The fact of error occurrence is communicated to a primary node so as to cause suspension, but not termination of communication with the affected node. Primary node notification occurs as a result of link synchronization errors through the switch; these errors occur as a result of local node recovery efforts which disable one or more of the ports which connect the affected node to the switch and thus to the other nodes in the network. Recovery operations at the affected node are performed so as to attempt to restore operation of the affected adapter based upon the specific error condition which was flagged. Applications running on the affected node are suspended but not terminated since the protocols that interface with the application are suspended and the applications are thus also "stalled." Likewise, applications running on nonaffected nodes for which communication with the affected node take place, are suspended for a specified period of time. Global communications with the affected node are resumed upon notification from the affected node that the error condition within the affected adapter has been corrected.

In accordance with another preferred embodiment of the present invention, a method is provided for handling adapter errors in a multinode data processing network in which node-to-node communication is at least partially handled by adapters connected to these nodes. The adapters operate to pass messages from the nodes through a switch which links the nodes in the network. The error handling method comprises the steps of detecting an error condition in an affected adapter connected to one of the nodes. The nature of the error is indicated by specific bit positions in error registers within the affected adapter. In the present invention some of these bits provide an error condition indicator which signals that recovery is possible but may take longer than the usually allotted time for recovery. Communication with the affected adapter is, in due course, at least temporarily suspended. However, related applications can continue to run on at least one of the unaffected nodes. Recovery operations are carried out at the affected node to try to restore operation of the affected adapter. Restoration operations are based on the specific nature of the error condition indicator as provided to interrupt handlers and passed along to a fault service daemon. Only if absolutely necessary are applications running on any of the nodes terminated. This occurs via action by the primary node upon a determination that recovery from the error condition is taking too long or via action at the affected node when it is determined that recovery operations at the affected node are not proceeding properly, as for example, when the number of adapter refresh operations exceeds a predetermined threshold. Communication is restored with the affected node when the primary node becomes successful at communication with one or more of the ports that have been re-enabled as a result of local recovery operations.

Accordingly, it is an object of the present invention to provide enhanced error recovery operations for adapters used for communications in multinode data processing networks.

It is a still further object of the present invention to prevent the unnecessary termination of applications running in nodes unaffected by an adapter error.

It is yet another object of the present invention to coordinate recovery operations associated with certain error conditions occurring in network adapter units.

It is also an object of the present invention to coordinate adapter error recovery on both the local level and on the global level.

It is a further object of the present invention to provide an increased spectrum of error level severity in adapter units.

It is a yet further object of the present invention to provide an environment in which suspended applications, at both the global level and at the local level, are restarted more frequently subsequent to the resolution of error conditions in adapter units.

It is yet another object of the present invention to extend the applicability and range of current error recovery mechanisms used in adapter units.

It is a further object of the present invention to provide an increased tolerance to adapter errors.

It is a still further object of the present invention to limit the termination of running global and local applications to those circumstances and to only those circumstances in which termination is absolutely necessary.

It is also an object of the present invention to increase the reliability of multinode data processing systems.

It is still another object of the present invention to facilitate the running of applications employing distributed and/or parallel data processing structures.

It is a still further object of the present invention to maintain applications running in a global environment while communications with parts running on other nodes are suspended and it is an object of the present invention to make the period of suspension as short as possible, but not so short that resolvable problems end up being treated as nonresolvable problems.

Lastly, but not limited hereto, it is an object of the present invention to reduce the number of adapter error events which cause termination of running applications.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DESCRIPTION OF THE INVENTION

Figure 1:
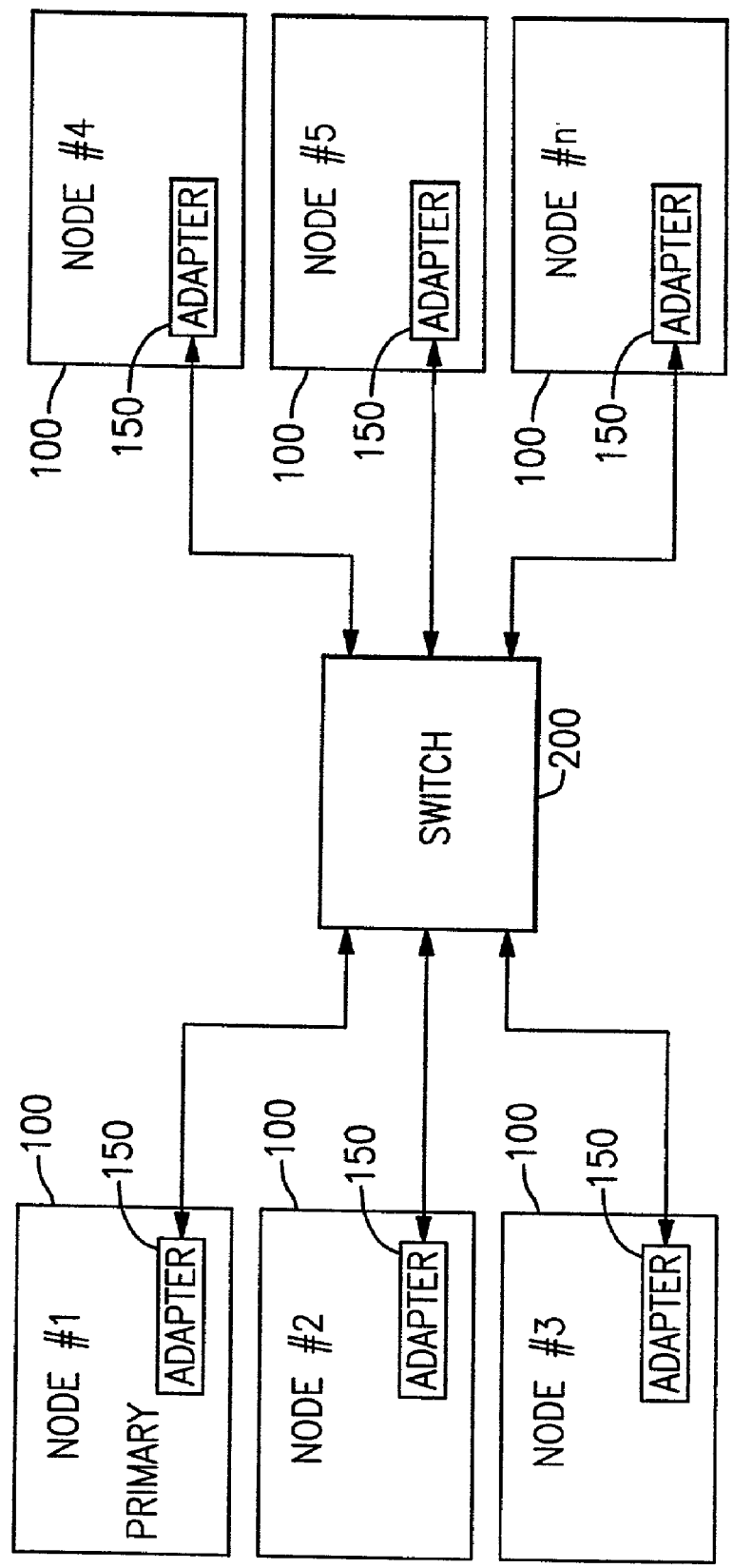
FIG. 1 is a block diagram of a multinode data processing system indicating the placement of adapter units as part of the internode communication system.

FIG. 1 illustrates in block diagram form the environment in which the present invention is employed. In particular, it is seen that various nodes 100 communicate with one another through switch 200 which permits any node in a defined group of nodes to send messages to application and other programs running on other nodes in the group. The group of nodes also typically includes one node (Node #1, as shown herein, for example) which is designated as a primary node or group leader for purposes of maintaining control and consistency and for providing a communications focal point. Each node 100 includes adapter 100 whose primary function is to map incoming messages to specific locations within the respective random access memories (RAM) of nodes 100. The present invention is specifically directed to problems associated with error conditions within these nodes. It is noted that the description presented herein assumes that adapters constitute an integral part of each the nodes. While this is true in preferred embodiments of the present invention, it is noted that this linkage is not an essential feature of the present invention and that nodes and adapters are not necessarily integral units.

In accordance with a preferred embodiment of the present invention, a new adapter error classification is provided and is referred to as being a "critical" error. As used herein, the term "critical error" refers to an error occurring in an adapter which is more than a transient error but not so severe as to be unrecoverable following an adapter reset or an adapter restart. This new error classification is employed as the primary mechanism for achieving the objects recited above.

Serious error bits that are provided within interrupt vector registers within adapters are defined as being critical errors with a bit specific threshold and time interval. The threshold and time interval (for example, two errors in twenty four hours) determine the number of times that a critical error causes the adapter to be refreshed, that is, reset and restarted. An adapter reset disables the ports. Once the threshold limit for refresh attempts is met, critical adapter errors (CA) become permanent adapter errors (PA). A permanent adapter error causes a reset but does not initiate an adapter restart operation. In this case ports remain disabled and the affected node is fenced by the switch. As indicated, once this threshold is met, the error condition severity is raised to the level of "permanent" error. This causes the node to be fenced and jobs running on that node are terminated. The fact that the ports are disabled causes link synchronization (link synch) errors that are seen by the switch. "Fencing" of a node is a term applied to switch operations which means that the "send port" on the switch that is connected to the affected adapter from the primary node is disabled so that messages are no longer sent via the switch to the node with the adapter problem. However, the primary node still leaves the receive port of the switch connected to the affected node in an operative state. Jobs running on other nodes that have not been fenced are also terminated if there is a necessary dependency on the activities of the fenced node and there is no application specific recovery scheme in place. Such recovery schemes must, of necessity, be specifically provided by individual application programs; accordingly, application program level recovery methods form no part of the present invention.

However, prior to meeting the threshold for declaring an adapter error to be permanent, the critical error handling method of the present invention takes several actions to maintain continued functioning of the node where the adapter error has occurred. In particular, the ports are disabled by the affected node and data transfer is thus halted and Direct Memory Access (DMA) operations between the affected adapter and the node RAM memory are halted to prevent I/O operations which could corrupt data. At the affected node communication protocols are suspended. The nonaffected nodes "know" nothing of the specific adapter problem; however, attempts to send messages to the affected node are at least temporarily suspended. The affected local node is the only one which suspends the communication protocols so as to stop message traffic prior to an adapter reset operation. This causes affected applications running on the other nodes to stall, but not to terminate. At the affected node, after the protocols are suspended, the error producing adapter is then reset and reinitialized in an attempt to clear the problem. This includes operations which reload microcode 155 into adapter 150. Problem clearance is indicated when adapter restart completes successfully as indicated by the contents of interrupt vector registers of various chips within the affected adapter. Once the relevant interrupt vector register bits are reset or are no longer indicate an active critical error severity (CA) status, communication protocols are resumed. The node with the affected adapter escalates the error status to "permanent" (PA) when a local recovery action fails or when the retry threshold is met within a specified time interval. If the time between resetting (port disablement in particular) and restarting (port re-enablement) is greater than the time interval that the primary node waits before fencing, the node is fenced off from through-switch communication by the primary node. However, the affected local node "knows" nothing of this operation. In this case the likely outcome is that application programs running on other nodes within the group also terminate unless they have provided for themselves some form of node failure recovery. With current technology, a period of from approximately five seconds to approximately 15 seconds is employed at the primary node as a workable time duration for waiting for node recovery operations to succeed. At the local node, time threshold limits are not typically employed as a mechanism for determining whether or not a transition to permanent error status is appropriate. Instead, this transition occurs when more than a certain number of adapter refreshes have been attempted and have failed within a specified period of time. For current technology, this number is preferably three two failures within four hours.

In accordance with another embodiment of the present invention, the critical adapter error recovery process is characterizable as having the following steps. First, the affected node recognizes the problem via error interrupts from its adapter. This recognition occurs via the contents of interrupt vector registers in the affected adapter. The node then classifies the recognized error as being a "critical" error (as that term is used herein). The affected node then acts locally to handle the error by any convenient mechanism including resetting and reinitialization of the affected adapter. At the same time, global operations with the affected node are suspended, preferably and typically by or through the group leader node. Global involvement is initiated via notification of the adapter error through the occurrence of a link synchronization error through switch 200 brought on by disablement of an adapter port. At the global level the critical error problem is processed in a fashion in which a link synchronization error is tolerated for a predetermined time period which is typically most closely matched to the time period normally encountered in successful adapter recovery operations. Successful adapter error recovery is effectively communicated to the primary node through re-enablement of the affected adapter ports so as to thus eliminate the occurrence of link synchronization errors. This time period also preferably includes the addition of an extra marginal amount to accommodate variations in adapter recovery operations. In this way drastic action involving "permanent" fencing is avoided until absolutely necessary. If the error is handled satisfactorily at the local node level within the predetermined time limits, including any marginal amounts, the global controlling element (typically the primary node), upon renewed port enablement, now becomes able to again send messages to the affected node. During local node recovery operations, applications running on non-affected nodes may have been attempting to send messages to the affected node without successfully having gotten through, but this does not necessarily cause such programs to terminate or to be terminated. If recovery fails, the affected local node is dropped from the network, thus allowing any other more traditional error recovery to take place, either via the controlling element or from within the applications themselves. During the time period between subsequent to identification of a "critical error" condition as determined from the contents of interrupt error registers, logging operations are performed at the local level so as to provide a mechanism for a more complete analysis of adapter error causes.

Figure 2:
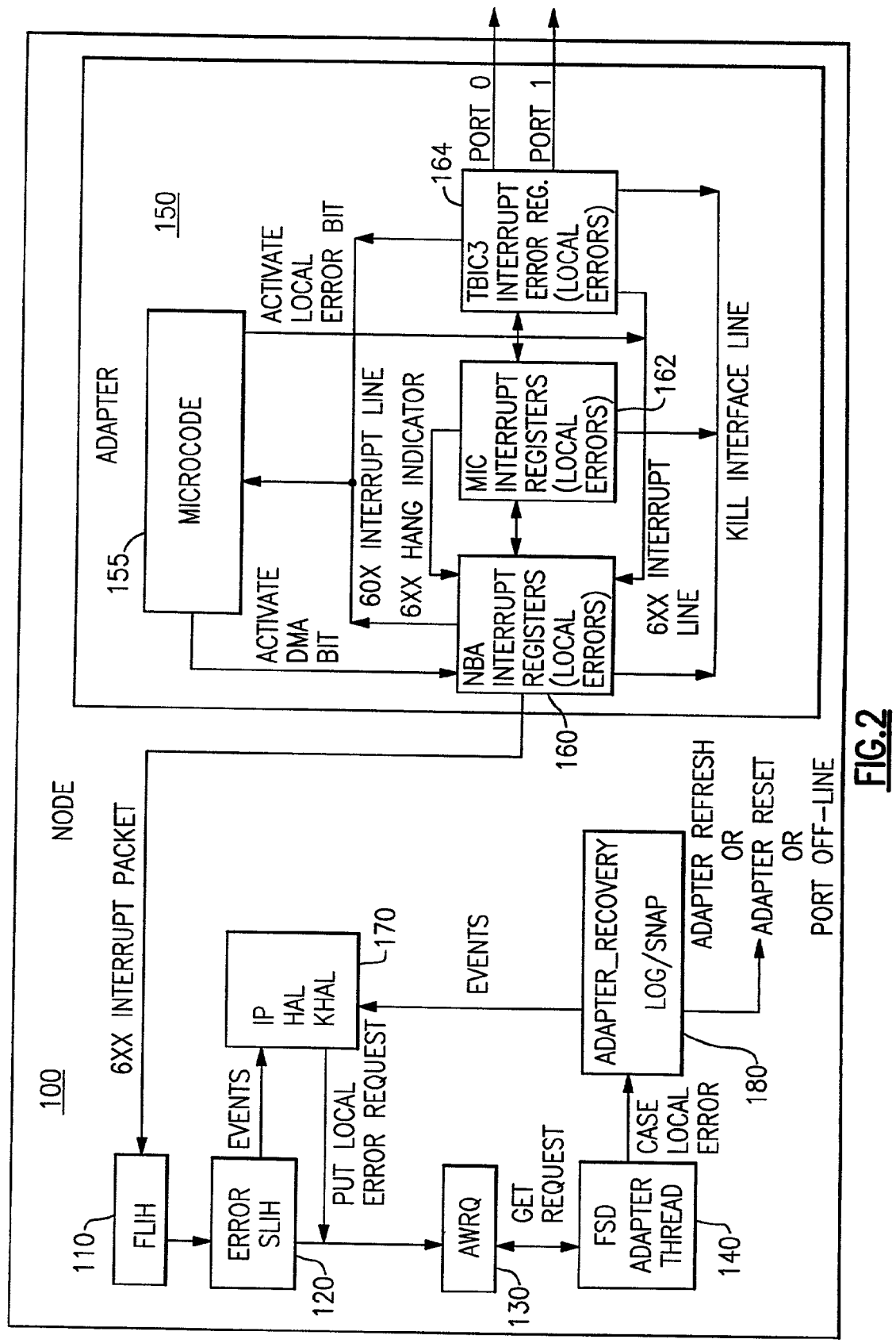
FIG. 2 is a detailed block diagram illustrating the structure of software and hardware components contained within one of the data processing nodes for carrying out the recovery process of the present invention.

FIG. 2 illustrates the interrelationship among hardware and software components that are employed in preferred embodiments of the present invention. The recovery sequence of the present invention begins when any one of the following events occur:

1. one of the adapter chips experiences a local error;
2. microcode programming 155 in adapter 150 experiences an error; or
3. IP (the internet protocol), HAL (the Hardware Abstraction Layer) or KHAL (the Kernel Hardware Abstraction Layer; see reference numeral 170) generate a local error request which is placed on Adapter Work Request Queue (AWRQ) 130 for processing by Fault Service Daemon 140.

In particular, if an error occurs in one of the adapter chips (NBA (Node Bus Adapter), MIC (Memory Interface Chip), or TBIC3 (Trail Blazer Interface Chip), as shown in FIG. 2) a local error flag is raised and set into adapter interrupt registers 160, 162 or 164, respectively. Adapter hardware includes interrupt error registers and a matching "6XX" enabled register. Any bit that is active in the 6XX register is enabled to raise an interrupt when the interrupt error register becomes active. These errors are handled by the INTR handler on the local node. The INTR handler (see FIG. 2) includes masks that define which bits are which type of error. Bits which are classified as "critical," as that term is used herein, are also setup to enable the Kill Interface. The Kill Interface is simply a mechanism which prevents the raising of DMA interrupts and thus stops DMA "mastering" operations and disables the ports, such as Port 0 and Port 1 which are shown if FIG. 2. In this case the TBIC3 chip, which controls access to Ports 0 and 1, is not synchronized with switch 200 and cannot send or receive data over the ports.

Adapter microcode programming 155 is responsible for raising 6XX error interrupts (for example, bad packets) and for responding to "DO" commands ("do_cmds") sent to the adapter. If the execution of microcode 155 in adapter 150 produces an error, an interrupt error register bit flag is raised. For this purpose, there is one specific bit in NBA interrupt register 160 set up to be 6XX enabled.

The IP programming function in block 170 is responsible for handling window events and clients. In rare instances it may also raise an error directly to Fault Service Daemon (FSD) 140, which waits for items to appear in Adapter Work Request Queue 130. The HAL and KHAL programming functions in block 170 are also responsible for handling window events and clients and, in rare instances, it too may also raise an error directly to Fault Service Daemon 140. Fault Service Daemon 140 is responsible for defining error bit thresholds and time intervals, error sources and descriptions which it supplies to Adapter Recovery Block 180 which reports events to block 170 and provides refresh, reset or port off-line signals to adapter 150, as shown in FIG. 2. It is also responsible for handling the interrupt error request passed from off-level error SLIH (Second Level Interrupt Handler) 120 or from the IP function in block 170.

In accordance with the operation of the present invention, Second Level Interrupt Handler 120 causes protocols 170 running on the local node to be suspended. This results in the applications running on the local node to be stalled. Related parallel or distributed applications running on nonaffected nodes are maintained in a running state which is possible since information packets sent to the affected node are simply dropped for the time being and may be resent later on. The important aspect, however, is that the primary node treats the problem as temporary and does not unnecessarily terminate affected running program applications.

In accordance with preferred embodiments of the present invention a hierarchical error classification and escalation scheme is employed. The errors are characterized as being either permanent or transient. The errors are further characterized as arising from an adapter or from a port. Accordingly, the following describes the spectrum of error types and the resultant handling:

TA and TP—Transient adapter and port errors (These include recoverable adapter and port errors for which a threshold and time interval is maintained and for which no action is taken)

CA—Critical adapter error (These include recoverable adapter errors for which a a threshold and time interval is maintained and for which there is a refresh of the adapter, that is, an adapter reset and reinitialization. An attempt is made to maintain running jobs and connectivity between node 100 and switch 200.)

PP—Permanent Port error (Unrecoverable port errors cause the specific port involved to be fenced. Administration intervention is required to recover the port, for example, by replacement of a cable. Once this is done, the adapter thread respawns the port thread when it receives its first service packet (for example, a packet requesting an unfencing operation).

PA—Permanent Adapter error (This is an unrecoverable error in which the node with the affected adapter is fenced; it is not unfenced until the adapter is refreshed. However, this type of error still involves the intervention of human system administrative personnel).

Figure 3:
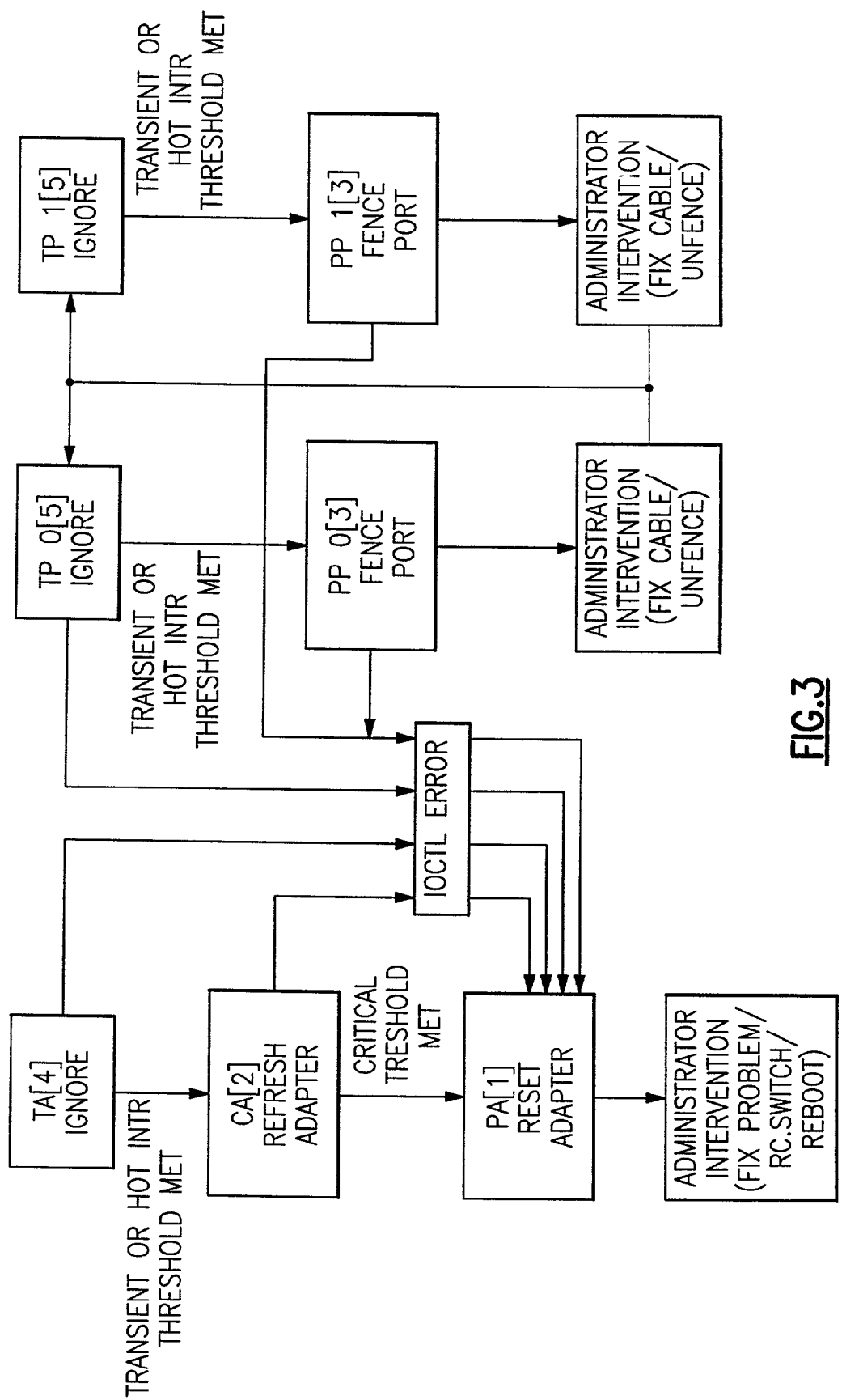
FIG. 3 is a block diagram illustrating the main actions and escalation paths taken on by the recovery process based on specific error classification.

FIG. 3 is a block diagram illustrating major actions and escalation paths employed by the recovery process of the present invention based on specific error classification (as described above) and severity/priority. The bracketed numbers correspond to error classification levels. These levels are ordered sequentially with the highest priority starting at "1." Normally transient adapter errors are ignored. Priority levels are employed when decoding multiple errors, that is, when multiple error bits are "on." Priority level information provides a mechanism for assuring that the highest priority level error is addressed. However, if a transient or Hot INTR error threshold is met which cannot be cleared from the interrupt registers, a Critical Adapter (CA) error (priority level 2) occurs and is handled initially via an adapter refresh operation. If a critical threshold is met, the critical error eventually becomes a Permanent Adapter (PA) error with the highest priority level of "1." The "ioctl error" block in FIG. 3 provides an interface for adapter I/O control.

The handling of the Critical Adapter error is specified in Table I below, which refers to activities at the local node. The acronym FLIH in Table I below refers to First Level Interrupt Handler 110 as shown in FIG. 2. If adapter start does not occur within a prespecified time interval, the affected node is fenced. It is noted that reset operations also disable the ports. Interrupts are serialized by means of the "stop global" interrupts. The "stop global" interrupt ensures that Fault Service Daemon 140 is able to handle the errors without any other error flags being raised at the same time. The interrupts are re-enabled through the adapter re-initialization process.

TABLE I

| ACTIONS: Critical Adapter Error | Responder: | | |
|---|---|---|---|
| Read Interrupt Error NBA | FLIH | | |
| Suspend Windows (Applications Stalled) | FLIH | | |
| Enable Stop Global Interrupts | FLIH | | |
| Reset Adapter (clear up hang conditions) | ErrorSLIH | | |
| Read Rest of Interrupt Error & Status Registers | ErrorSLIH | | |
| FSD Pass INTR Error/Status Registers - Active Bits | ErrorSLIH | | |
| Decode Error Bits | FSD | | |
| Maintain Threshold & Escalate Error | FSD | Met | |
| Log hardware data (for later software debugging) that would be lost following an adapter restart | FSD | | |
| Start Adapter | FSD | Fail | |
| Suspend Microcode | FSD | Fail | |
| Load Route Tables | FSD | Fail | |
| Resume Microcode | FSD | Fail | |
| Resume Suspended Windows (application has timed out or continues) | FSD | | |
| Error Entry - System Error & Adapter Thread Logs | FSD | | |
| Log final non-hardware | FSD | | |
| ACTIONS: Permanent Adapter Error | Responder: | | |
| Release Windows | FSD | | |
| If Required - Reset & Take Snap (Late Hardware) | FSD | | |
| Error Entry - System Error & Adapter Thread Logs | FSD | | |
| Log final non-hardware status to archive | FSD | | |
| Shutdown Adapter & Port Threads | FSD | | |

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for handling errors in adapters used for communication in data processing network having at least two nodes connected through a switch, said error handling method comprising the steps of:
   detecting a nonpermanent error condition, within an adapter connected to one of said nodes, from which recovery is possible from within the node connected to said adapter;
   suspending communications from within the node with the adapter affected by said error condition;
   disabling communication between said affected adapter and said switch so as to provide an indication to at least one other node in said network that communication with said affected adapter is at least temporarily suspended so as to effectively cause suspension of, but not termination of, applications running on said at least one other node in said network;
   performing recovery operations, at said affected node, to restore operation of said affected adapter, based on said detected error condition, said recovery including enablement of said disabled communication; and
   resuming communication with said affected adapter upon enablement of said disabled communication.

2. A method for handling adapter errors in a multinode data processing network in which node-to-node communication is at least partially handled by adapters connected to said nodes, said adapters operating to pass messages from said nodes through a switch which links the nodes in said network, said error handling method comprising the steps of:
   detecting a nonpermanent error condition, within an adapter connected to one of said nodes, from which recovery is possible from within the node connected to said error affected adapter;
   suspending communication from the node connected to said affected adapter;
   disabling communication between said affected adapter and said switch so as to provide an indication to at least one other node in said network that communication with said affected adapter is at least temporarily suspended, so as to effectively cause suspension of, but not termination of, applications running on said at least one other node in said network;
   performing recovery operations, at said affected node, to restore operation of said affected adapter, based on said detected error condition, said recovery including enablement of said disabled communication;

terminating said running applications on nonaffected nodes in said network upon a determination that reestablishment of communication with said affected adapter is taking too long; and otherwise maintaining said running applications and restoring communication with said affected node after performance of said recovery operations.

3. The method of claim 2 in which at least one of said applications is running in a window environment.

4. The method of claim 2 in which said suspending step includes disabling at least one communication port via which said adapter is connected to said switch.

5. The method of claim 2 in which said suspending step further includes halting direct memory access between said affected adapter and the node to which it is connected.

6. The method of claim 2 in which recovery operations includes logging operations which are carried for said adapter to facilitate error analysis.

* * * * *